US006234073B1

(12) United States Patent
Dieso et al.

(10) Patent No.: US 6,234,073 B1
(45) Date of Patent: May 22, 2001

(54) APPARATUS FOR SPIRALLY SLICING BONELESS MEAT

(75) Inventors: Stephen D. Dieso, Parkville, MO (US); David L. Fawcett, New Riegel, OH (US)

(73) Assignee: Farmland Foods, Inc., Kansas City, MI (US)

( * ) Notice: Subject to any disclaimer, the term of this patent is extended or adjusted under 35 U.S.C. 154(b) by 0 days.

(21) Appl. No.: 09/594,104

(22) Filed: Jun. 14, 2000

Related U.S. Application Data

(62) Division of application No. 09/197,094, filed on Nov. 19, 1998, now Pat. No. 6,096,360.

(51) Int. Cl.[7] ........ A23L 1/00

(52) U.S. Cl. ........ 99/538; 99/589; 99/593; 99/595

(58) Field of Search ........ 99/537–541, 588–599, 99/491, 545, 492, 576; 426/518, 513, 112, 115, 129, 641; 83/672, 733; 452/155, 160

(56) References Cited

U.S. PATENT DOCUMENTS

| | | | | |
|---|---|---|---|---|
| 2,056,843 | * | 10/1936 | Erro | 99/595 |
| 2,599,328 | * | 6/1952 | Hoenselaar | 99/537 |
| 3,916,737 | * | 11/1975 | Libicki | 99/537 X |
| 4,170,174 | * | 10/1979 | Ditty et al. | 99/538 |
| 4,287,820 | * | 9/1981 | Urban | 99/538 X |
| 4,332,190 | * | 6/1982 | Mart | 99/538 |
| 4,374,490 | | 2/1983 | Boyer | 99/538 |
| 4,412,483 | * | 11/1983 | Hoegh | 99/538 |
| 4,441,411 | * | 4/1984 | Mullins, Jr. | 99/538 |
| 4,821,635 | | 4/1989 | Logan, Jr. | 99/538 |
| 5,251,543 | | 10/1993 | Brothers | 99/538 |

* cited by examiner

*Primary Examiner*—Timothy F. Simone
(74) *Attorney, Agent, or Firm*—William B. Kircher; Shook, Hardy & Bacon LLP

(57) ABSTRACT

A method and apparatus for spirally slicing boneless meat without the need for a center support rod. A slicing machine for the meat includes a rotatable base and an elevated chuck both having prongs for clamping the meat between them. Separate motors independently turn the base and chuck at the same rotational speed so that there is no twisting of the meat from top to bottom. A slicing blade is moved vertically on the machine as it slices the meat spirally about a solid meat core extending along the rotational axis.

7 Claims, 1 Drawing Sheet

APPARATUS FOR SPIRALLY SLICING BONELESS MEAT

This application is a divisional of Ser. No. 09/197,094, filed Nov. 19, 1998, now U.S. Pat. No. 6,096,360.

FIELD OF THE INVENTION

This invention relates generally to meat slicing and more particularly to the spiral slicing of meats such as ham and turkey. Still more particularly, the invention relates to the spiral slicing of boneless meat without the use of a center support during the slicing operation.

BACKGROUND OF THE INVENTION

Spirally sliced ham and turkey have enjoyed considerable popularity, primarily because consumers find it convenient to be able to quickly and easily remove the precut slices at the point of use. The meat is sliced about a core that remains intact in order to retain the slices attached to the meat without falling off or folding over. At the same time, the individual slices can be easily detached for consumption.

Both boneless and "bone in" meats have been offered as spirally sliced products. In the case of a product having a bone, the meat is sliced about the bone and a core of meat immediately surrounding the bone remains uncut to hold the slices together. In the case of boneless meat, a central core of meat is left uncut in order to hold the product together. In both cases, it is desirable to maintain the core as small as possible while retaining sufficient meat in the core to prevent the slices from detaching or becoming so loose that they fold over or otherwise deform.

When meat having a bone is spirally sliced, the bone which remains in place at the center provides ample support from end to end while the meat is being sliced using suitable machinery. However, support for the meat is a problem during spirally slicing of boneless meat. Typically, the meat is held in a slicing machine on a rotating base and is clamped from above by a chuck device that rotates with the meat in the manner of an idler member. In the absence of a support, boneless meat that is sliced in this fashion tends to twist from top to bottom due to the drag applied by the cutting blade. Because the base which underlies the meat is directly driven by a motor, the base is largely unaffected by the blade drag and travels at a constant speed. However, the top chuck is not driven and tends to slow down as a result of the drag force applied by the blade. Thus, there is a differential speed between the top and bottom of the meat, and the result is a tendency for the meat to twist. As the meat is progressively sliced, the twisting becomes more pronounced because the loose meat slices are unable to resist the tendency to twist about the relatively small core at the center. At times, the slices can detach from the core and the entire product can be ruined.

This problem can be overcome by making use of a center support rod or skewer. The rod is driven through the meat to extend along the rotational axis at the center of the core. It is attached to the base at its lower end, and a removable chuck is applied to its top end above the meat. The chuck can be clamped to the top of the meat and locked to the rod. Consequently, when the base is rotated, the rod and the top chuck rotate with it. Because the chuck firmly grips the meat, the top of the meat rotates at the same speed as the base. This eliminates the differential speed that can cause the meat to twist. The rod can be removed following completion of the slicing operation.

Although a support rod of this type can essentially eliminate twisting of the meat as it is being sliced, the use of a rod complicates the process considerably. The rod must be driven through the meat and the top chuck must be applied to the rod, clamped against the meat and locked in place at the beginning of each slicing cycle. At the end of the slicing cycle, the chuck must be loosened and removed and the rod must be pulled out of the core. These added steps complicate and slow down the meat slicing process significantly. Also, they increase the chances for human error to cause problems. If the operator is unskilled or inexperienced, the rod can be skewed or applied at an off center position. This can result in the meat being sliced improperly, sometimes to the point where the product is so unattractive that it is commercially unacceptable.

SUMMARY OF THE INVENTION

The present invention is directed to a method and apparatus for spirally slicing boneless meat products in a manner to overcome the problem of twisting without the need for a support rod. As a result, a commercially attractive product is provided and the complications and delays associated with the use of a support rod are avoided.

In accordance with the invention, a machine for spirally slicing a boneless cut of meat includes a rotational base on which the meat is received. An elevated chuck assembly includes a chuck that can be lowered against the meat in order to grip it from the top. The base and chuck are rotated independently by separate motors which operate at the same rotational speed so that there is no differential speed between the top and bottom of the meat that can result in twisting. A conventional slicing blade is used to slice the meat while leaving a solid core at the center. The blade is moved vertically so that the meat is sliced spirally about the core.

This arrangement has the advantage of assuring that the top of the meat is rotated at the same speed as the bottom so that there is no tendency to twist the meat from top to bottom. At the same time, there is no need for an added support member such as a support rod which can complicate and prolong the meat slicing operation. Consequently, the present invention solves the problem of twisting of boneless meat products during spiral slicing without introducing other problems such as those associated with the use of a center support rod.

BRIEF DESCRIPTION OF THE DRAWINGS

In the accompanying drawings which form a part of the specification and are to be read in conjunction therewith and in which like reference numerals are used to indicate like parts in the various views.

DETAILED DESCRIPTION OF THE INVENTION

Figure 1:
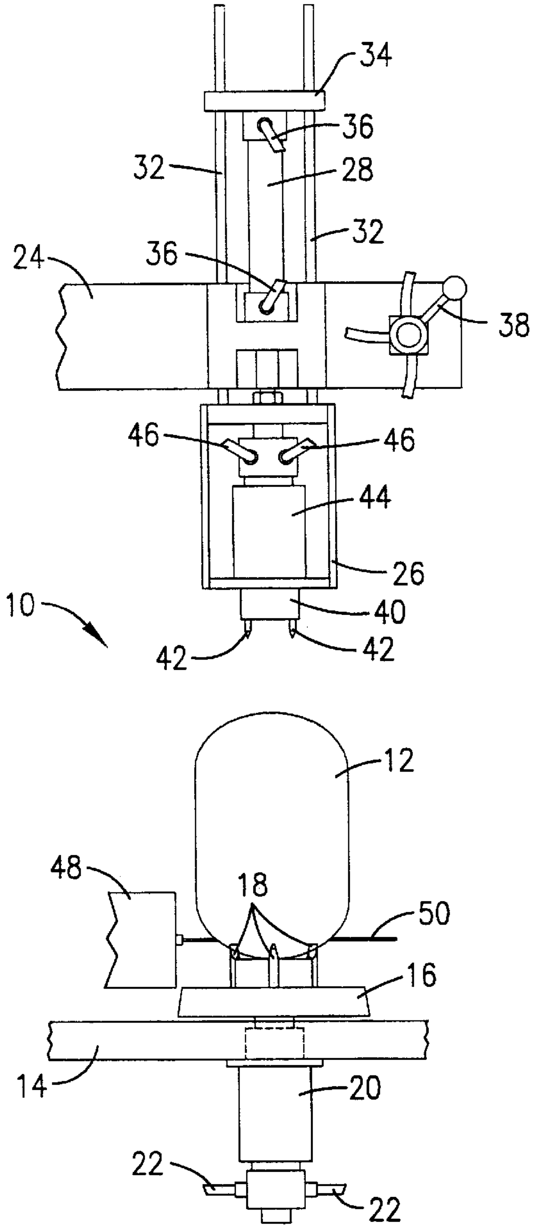
FIG. 1 is a fragmentary front elevational view of a meat slicing machine for spirally slicing boneless meat products according to a preferred embodiment of the present invention, with the upper chuck assembly raised to its release position spaced above a boneless ham received on the base of the machine.

Referring now to the drawings in more detail, numeral 10 generally designates a machine which is used for the spiral slicing of a meat product such as a boneless ham 12. The machine 10 is useful in spiral slicing many other boneless meat products such as poultry, beef, and lamb.

The machine 10 has a rigid frame which includes a horizontal table 14. A lower chuck of the machine is provided by a base 16 which is mounted on the table 14 for rotation about a vertical axis extending centrally through the base 16. A plurality of prongs 18 extend upwardly from the base 16. The ham 12 may be received on the base 16 with the prongs penetrating the bottom of the ham 12 in order to securely grip the ham from the bottom.

The base 16 may be rotated by a suitable motor such as a pneumatic motor 20 mounted to the underside of the table 14. Pneumatic lines 22 are provided for supplying air to the motor 20. The motor 20 may be operated at a selected rotational speed which is constant.

The frame of the machine 10 includes an elevated beam 24 which is located well above the table 14. A bracket 26 is mounted on the beam 24 for reciprocating movement upwardly and downwardly. A pneumatic cylinder 28 is mounted on the beam 24 and has a piston rod 30 which connects at its lower end with a top plate of the bracket 26. A plurality of vertical guide rods 32 extend upwardly from the top plate of bracket 26 and extend through the beam 24 in a manner allowing the guide rods to move upwardly and downwardly relative to the beam 24 while restricting the bracket 26 to vertical movement. The upper end portions of the guide rods 32 extend slidably through a base plate 34 which connects with the upper or base end of the cylinder 28. The cylinder 28 has pneumatic lines 36 which supply air to the opposite ends of the cylinder from a suitable air source (not shown). A control handle 38 is provided to control the application of air to the pneumatic cylinder 28.

A chuck 40 which is carried on the bottom end of bracket 26 provides a top chuck that cooperates with the base 16 to securely grip the ham 12 while the ham is being sliced in accordance with the present invention. The chuck 40 is mounted for rotation on bracket 26 about a vertical axis that is coincident with the rotational axis of the base 16. Chuck 40 includes a plurality of downwardly projecting prongs 42 which dig into the top of the ham 12 in order to grip the ham.

The chuck 40 is rotated by a motor such as a pneumatic motor 44 which may be mounted on the bracket 26. Motor 44 is provided with pneumatic lines 46 which supply air under pressure to the motor from a suitable source of air (not shown). Motor 44 drives the chuck 40 at the same rotational speed as motor 20 drives the base 16.

The meat slicing machine 10 is equipped with a slicing assembly that includes a support block 48 holding a cutting blade 50. The block 48 may be mounted on the frame of the machine for pivotal movement and for up and down movement. The support block 48 and blade 50 may be the same general type disclosed in U.S. Pat. No. 5,251,543 to Brothers. The block 48 may be pivoted to the cutting position shown in solid lines in FIG. 3 in which the blade 50 penetrates into the ham 12 far enough to slice the ham while leaving a solid core 52 of meat intact at the center of the ham. The blade 50 has a cutting edge **50*a* (FIG. 3) for slicing of the meat. The blade 50 may be reciprocated to provide an effective cutting action. The support block 48 may be pivoted away from the ham 12 to the broken line position shown in FIG. 3 which is a retracted position in which the blade 50 is retracted well away from the ham so that the meat can be loaded onto and unloaded from the base 16**.

The block 48 is gradually raised on the frame of the machine at a steady rate as the slicing operation progresses. This vertical movement of the block 48 carries the blade 50 with it so that the blade is moved upwardly in a linear fashion along the vertical rotational axis of the machine during the meat slicing operation. The upward movement of the block 48 may be carried out at any suitable manner such as by providing a threaded screw mechanism (not shown) or another type of known mechanism suitable for this purpose.

In operation of the machine 10, the motors 20 and 44 are initially deenergized so that the ham 12 can be inserted onto the base 16 with the prongs 18 penetrating the lower end of the ham in order to securely grip it and cause it to rotate with the base 16. The ham is inserted with the cylinder rod 30 retracted to raise the bracket 26 and chuck 40 to the raised position shown in FIG. 1. This provides clearance so that the ham 12 can be inserted onto the base 16.

Figure 2:
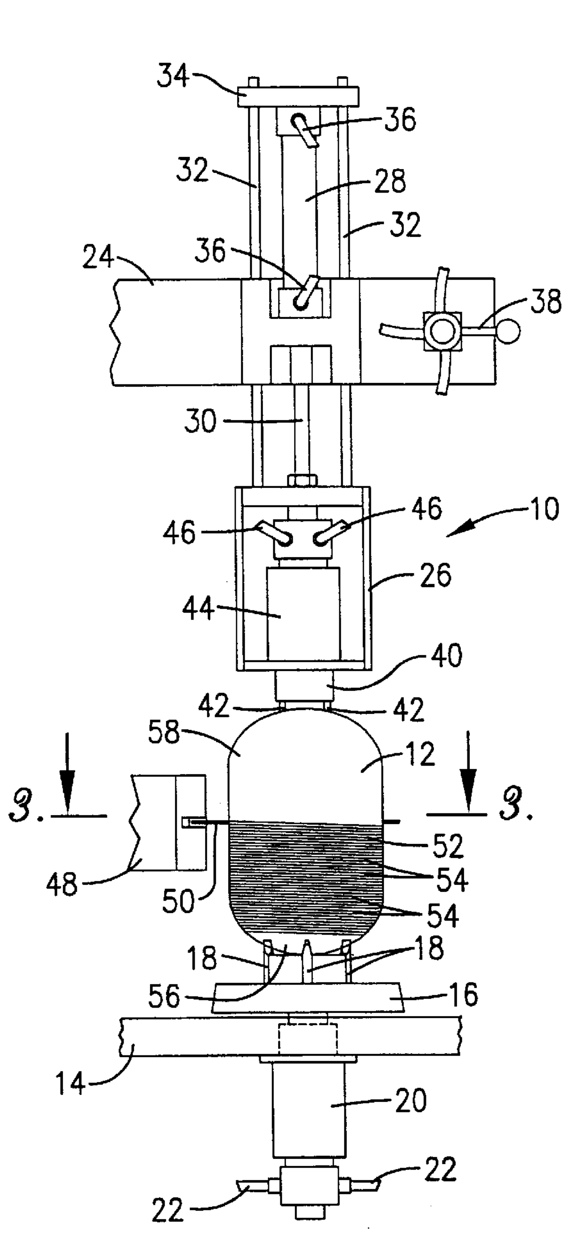
FIG. 2 is a fragmentary front elevational view similar to FIG. 1, but showing the upper chuck assembly lowered to grip against the top of the ham and showing the ham partially sliced by the cutting blade of the machine.

After the ham is suitably positioned on the base 16, cylinder 28 is activated to extend its rod 30, thus lowering the bracket 26 to the position shown in FIG. 2. In this position, the chuck 40 is lowered against the top of the ham 12, and the prongs 42 dig into the top of the ham in order to securely grip it from the top. Then, the motors 20 and 44 are energized to rotate the base 16 and chuck 40 separately and independently at the same rotational speed. Consequently, the ham 12 is rotated positively from above and below at the same speed so that there is no differential in the speed or force applied to the top and bottom of the ham.

Although motors 20 and 44 have been described above to rotate the base 16 and chuck 40, the drive means could employ a single motor in combination with a transmission to drive the base 16 and chuck 40 at the same rotational speed. As known to one of reasonable skill in the art, any number of transmissions could be used in the drive means to rotate the base 16 and chuck 40 at the same speed. Generally, the transmission could utilize a plurality of gears, pulleys, and/or belts to communicate the motor with both rotating components. In one exemplary embodiment, the base could be driven by a single motor mounted proximate the underside of the base. A power take off gear train transmission having a plurality of gears could impart the rotary motion of the motor to chuck 40 to rotate chuck 40 at the same speed as base 16. In another embodiment, the motor could be positioned at a remote location between the base 16 and chuck 40. The motor could rotate a geared transmission shaft in communication with the base 16 and chuck 40. A variety of other transmissions could be used in combination with a single motor to drive the upper and lower chucks at the same rotational speed to prevent the disadvantageous twisting of the meat during slicing.

Figure 3:
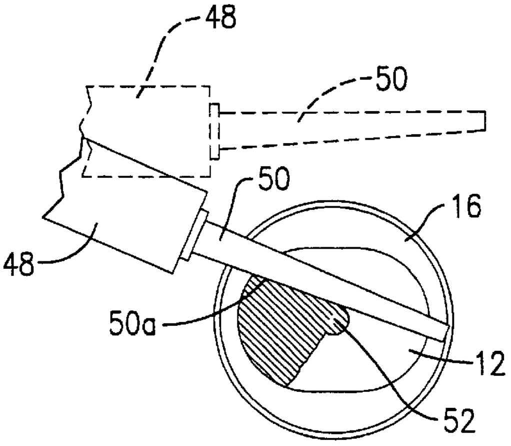
FIG. 3 is a fragmentary sectional view on an enlarged scale taken generally along line 3—3 of FIG. 2 in the direction of the arrow, with the broken line showing the knife of the machine retracted from the ham.

As the ham 12 is rotated about the common vertical axis of the rotating base 16 and chuck 40, the block 48 is pivoted to the cutting position shown in solid lines in FIG. 3 to begin slicing the ham 12 near its lower end. The block 48 is progressively raised to progressively raise the blade 50 so that the blade makes a spiral cut in ham 12 in order to create individually spirally cut meat slices 54 (FIG. 2) as the cutting operation proceeds. The slices 54 are cut about and remain attached to the central core 52 which is centered on the rotational axis of the machine.

When the ham has been fully sliced in this fashion, the blade 50 is near the upper end of the ham. The blade 50 can be retracted to the solid line position shown in FIG. 3, and the motors 20 and 44 can be deenergized to stop the rotation of the ham. The cylinder 28 is then retracted to retract its rod 30 and withdraw the chuck 40 from the top of the ham 12. The ham can then be lifted off of the base 16 and the next slicing cycle can be initiated.

Each of the slices 54 remains attached to the core 52 so that the finished product retains stability and the slices 54 do not tend to fall off of the product or fold over or otherwise become deformed.

As it is being sliced, the ham 12 is securely clamped between the base 16 at the bottom and the chuck 40 at the top. The ham preferably has an unsliced portion 56 at the bottom and a similarly unsliced portion 58 at the top which are gripped by the prongs 18 and 42, respectively. The portions 56 and 58 are securely attached to the core 52, so these portions and the core 52 are rotated as a unit during the slicing operation. Because the motors 20 and 44 are operated at the same rotational speed, the top of the ham is rotated at the same speed as the bottom, and there is no tendency for the product to twist as a result of drag forces applied by the cutting blade 50. In addition, there is no need for an added support member such as a support rod or the like because the twisting problem is solved by the use of separate motors to rotate the top and bottom of the ham 12.

From the foregoing it will be seen that this invention is one well adapted to attain all ends and objects hereinabove set forth together with the other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative, and not in a limiting sense.

Having thus described the invention, what is claimed is:

1. Apparatus for spirally slicing boneless meat such as ham or turkey, said apparatus comprising:

a frame having a pair of spaced apart chucks arranged to clamp the meat therebetween, said chucks being mounted on said frame to rotate independently about a common axis;

a pair of motors connected with the respective chucks and operable independently to rotate said chucks at substantially the same rotational speed to rotate the meat about said axis at said rotational speed without applying a differential force twisting the meat; and a blade mounted on said frame at a location to slice the meat in a manner to leave an unsliced core extending generally along said axis, said blade being movable linearly in the direction of said axis to spirally slice the meat about said core as the meat is rotated about said axis at said rotational speed.

2. Apparatus as set forth in claim 1, wherein one of said chucks comprises a rotatable base situated to receive the meat thereon and the other of said chucks is spaced above said one chuck, said axis having a generally vertical orientation.

3. Apparatus as set forth in claim 2, including a bracket mounted on said frame at a location above said base for generally vertical movement, said bracket carrying said one chuck toward and away from meat received on the base.

4. Apparatus as set forth in claim 3, including a power actuator operable to move said bracket up and down.

5. Apparatus for spirally slicing boneless meat such as ham or turkey, said apparatus comprising:

a frame;

a base supported on said frame for rotation about a substantially vertical axis at a location to receive the meat;

a first motor connected with said base to effect rotation thereof about said axis at a selected rotational speed;

a chuck element mounted on said frame for rotation about said axis and for generally vertical movement between raised and lowered positions, said chuck element in the lowered position thereof being located to grip the top of the meat;

a second motor connected with said chuck element to effect rotation thereof about said axis at said selected rotational speed, whereby the meat is rotated from above and below without a differential force twisting the meat; and a blade mounted on the frame at a location to slice the meat while leaving an unsliced core, said blade being movable vertically on the frame to spirally slice the meat about said core as the meat is rotated at said selected rotational speed.

6. Apparatus as set forth in claim 5, including a power actuator operable to move said chuck between the raised and lowered positions thereof.

7. Apparatus for spirally slicing boneless meat such as ham or turkey, said apparatus comprising:

a frame having a pair of spaced apart chucks arranged to clamp the meat therebetween, said chucks being mounted on said frame to rotate independently about a common axis;

a drive means connected with said chucks for rotating said chucks at substantially the same rotational speed to rotate the meat about said axis at said rotational speed without applying a differential force twisting the meat; and a blade mounted on said frame at a location to slice the meat in a manner to leave an unsliced core extending generally along said axis, said blade being movable linearly in the direction of said axis to spirally slice the meat about said core as the meat is rotated about said axis at said rotational speed.

* * * * *